(12) United States Patent
Sato et al.

(10) Patent No.: US 8,368,980 B2
(45) Date of Patent: Feb. 5, 2013

(54) IMAGE PROCESSING APPARATUS AND IMAGE PROCESSING METHOD

(75) Inventors: Mineko Sato, Yokohama (JP); Shinichi Fukada, Kawasaki (JP); Tsutomu Murayama, Yokohama (JP); Kunio Yoshihara, Hachioji (JP); Hiroyuki Kimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 957 days.

(21) Appl. No.: 12/420,625

(22) Filed: Apr. 8, 2009

(65) Prior Publication Data
US 2009/0257099 A1 Oct. 15, 2009

(30) Foreign Application Priority Data
Apr. 14, 2008 (JP) ................. 2008-104647

(51) Int. Cl.
*H04N 1/46* (2006.01)
*H04N 1/60* (2006.01)
*H04N 1/40* (2006.01)

(52) U.S. Cl. ........ 358/530; 358/538; 358/443; 358/448; 358/447; 358/1.9; 358/2.1; 358/3.01

(58) Field of Classification Search .................. None
See application file for complete search history.

(56) References Cited

U.S. PATENT DOCUMENTS

| | | | | |
|---|---|---|---|---|
| 7,626,728 | B2 * | 12/2009 | Itagaki et al. .................. | 358/1.9 |
| 2007/0252869 | A1 * | 11/2007 | Goto et al. ....................... | 347/34 |
| 2009/0244580 | A1 * | 10/2009 | Fujimoto et al. ............... | 358/1.9 |

FOREIGN PATENT DOCUMENTS

JP 5-95474 A 4/1993

* cited by examiner

*Primary Examiner* — Cheukfan Lee
(74) *Attorney, Agent, or Firm* — Canon U.S.A., Inc., IP Division

(57) ABSTRACT

An image processing apparatus includes a region detection unit configured to detect from an image a region which is sandwiched between a pair of opposite lines and in which image formation is performed at a density lower than a predetermined density, a rendering unit configured to render a border of an inner portion inside the region sandwiched between the pair of opposite lines with a line having a density higher than the predetermined density, and an outputting unit configured to output an image in which the inner portion inside the region sandwiched between the pair of opposite lines is bordered by the border rendered by the rendering unit.

23 Claims, 12 Drawing Sheets

FIG. 3A  FIG. 3B  FIG. 3C
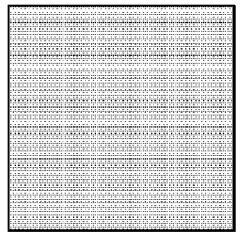 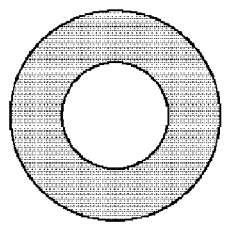 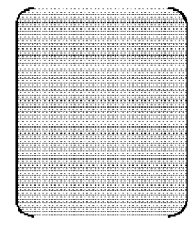
FIG. 4
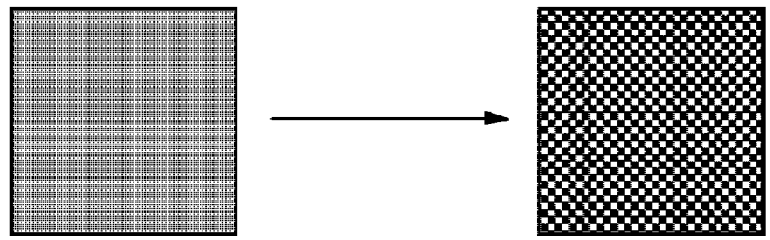
FIG. 5
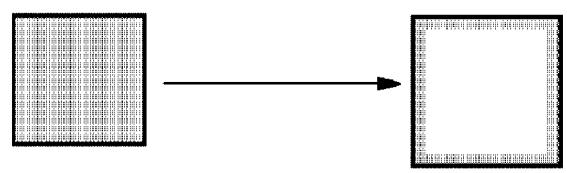

IMAGE PROCESSING APPARATUS AND IMAGE PROCESSING METHOD

BACKGROUND OF THE INVENTION

1. Field of the Invention

The present invention relates to an image processing apparatus and an image processing method for forming images.

2. Description of the Related Art

In printers, faxes, and copiers employing an electrophotographic method, it is difficult to reproduce a highlighted portion of an image due to data loss caused by quantization of image data or the lack of toner attraction force that is a problem specific to such an electrophotographic method.

A portion having a pixel density that is 15 percent or less of the pixel density of a solid black portion will be hereinafter referred to as the most highlighted portion.

It is possible to solve the lack of toner attraction force by changing, for example, a transfer current process in an electrophotographic apparatus.

However, a so-called fog phenomenon in which toner is supplied to a portion requiring no toner on a sheet sometimes occurs.

Accordingly, an image processing method of forming an image without loss of data at the time of quantization of original image data and an image processing method of forming an image with sufficiently large toner attraction force between toner particles or between each toner particle and a photosensitive drum without dispersion of toner have been proposed.

Japanese Patent Laid-Open No. 5-95474 discloses a technique for binarizing image data while maintaining the density levels of pixels near a pixel of interest on an image at the time of quantization of the image data.

Using this technique, toner can be intensively supplied while minimizing loss of original image data of a highlighted portion.

Thus, in order to improve the roughness of an image due to binarization of image data, a method of converting image data into multi-valued image data at the time of quantization of the image data has come into general use.

However, even if the above-described method is used, the most highlighted portion of an original image is reproduced with a small amount of toner.

Accordingly, the attraction force between toner particles or between each toner particle and a photosensitive drum may not become sufficiently large, and a toner image may not be developed on a photosensitive drum.

Furthermore, a toner image on a photosensitive drum may not be transferred to a sheet, and the most highlighted portion of an image may not be reproduced.

Still furthermore, the efficiency of transferring toner to a sheet may be changed in accordance with a print environment or the endurance of a printer, and the most highlighted portion of an image may not be reproduced.

SUMMARY OF THE INVENTION

According to one aspect of the invention, there is provided an image processing apparatus including: a region detection unit configured to detect from an image a region which is sandwiched between a pair of opposite lines and in which image formation is performed at a density lower than a predetermined density; a rendering unit configured to render a border of an inner portion inside the region sandwiched between the pair of opposite lines with a line having a density higher than the predetermined density; and an outputting unit configured to output an image in which the inner portion inside the region sandwiched between the pair of opposite lines is bordered by the border rendered by the rendering unit.

Further features of the present invention will become apparent from the following description of exemplary embodiments with reference to the attached drawings.

BRIEF DESCRIPTION OF THE DRAWINGS

FIGS. 3A, 3B, and 3C illustrate examples of a region to be converted according to the first embodiment.

FIG. 4 illustrates an example of image processing B according to the first embodiment.

FIG. 5 illustrates an example of image processing A according to the first embodiment.

DESCRIPTION OF THE EMBODIMENTS

In first to ninth embodiments, in order to appropriately reproduce the most highlighted portion, image processing applying the "watercolor effect", which is a kind of illusion effect, is performed upon an image having a density equal to or lower than a certain density.

The "watercolor effect" was proposed by Pinna, and Brelstaff and Spillmann.

Human beings have a visual characteristic called "color complementation" in which they see something that is not really there by complementing a color.

The "watercolor effect" is an effect using such a visual characteristic.

The "watercolor effect" is an illusion caused by relatively comparing a border with a line inside the border.

If an inner portion inside the border is bordered with a color different from the color of the border, the inner portion is perceived as being lightly painted with the color used for bordering.

Figure 1:
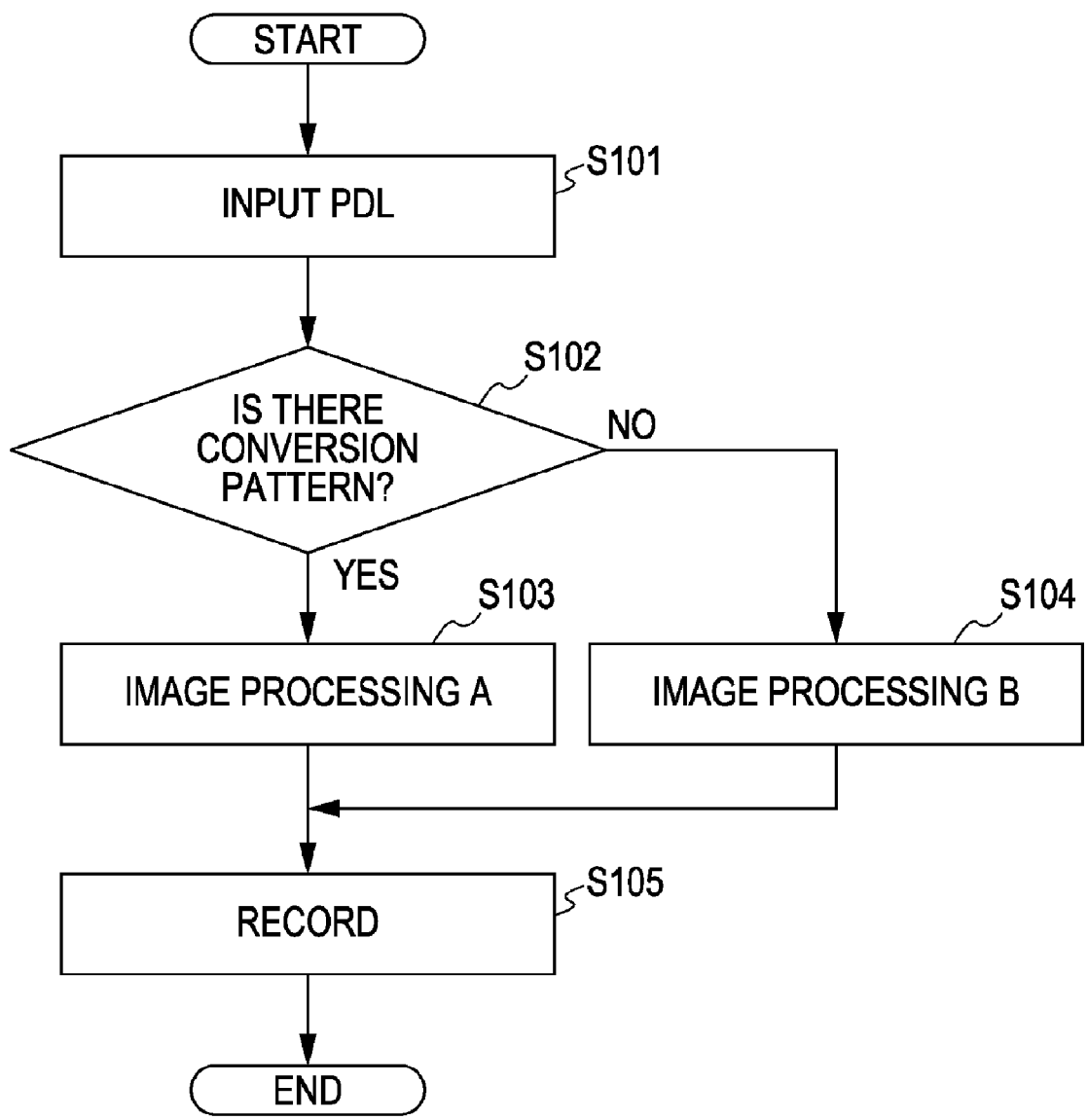
FIG. 1 is a flowchart describing a first embodiment.

The first embodiment of the present invention will be described with reference to FIGS. 1, 2, and 10.

Configuration of Image Processing System

Figure 2:
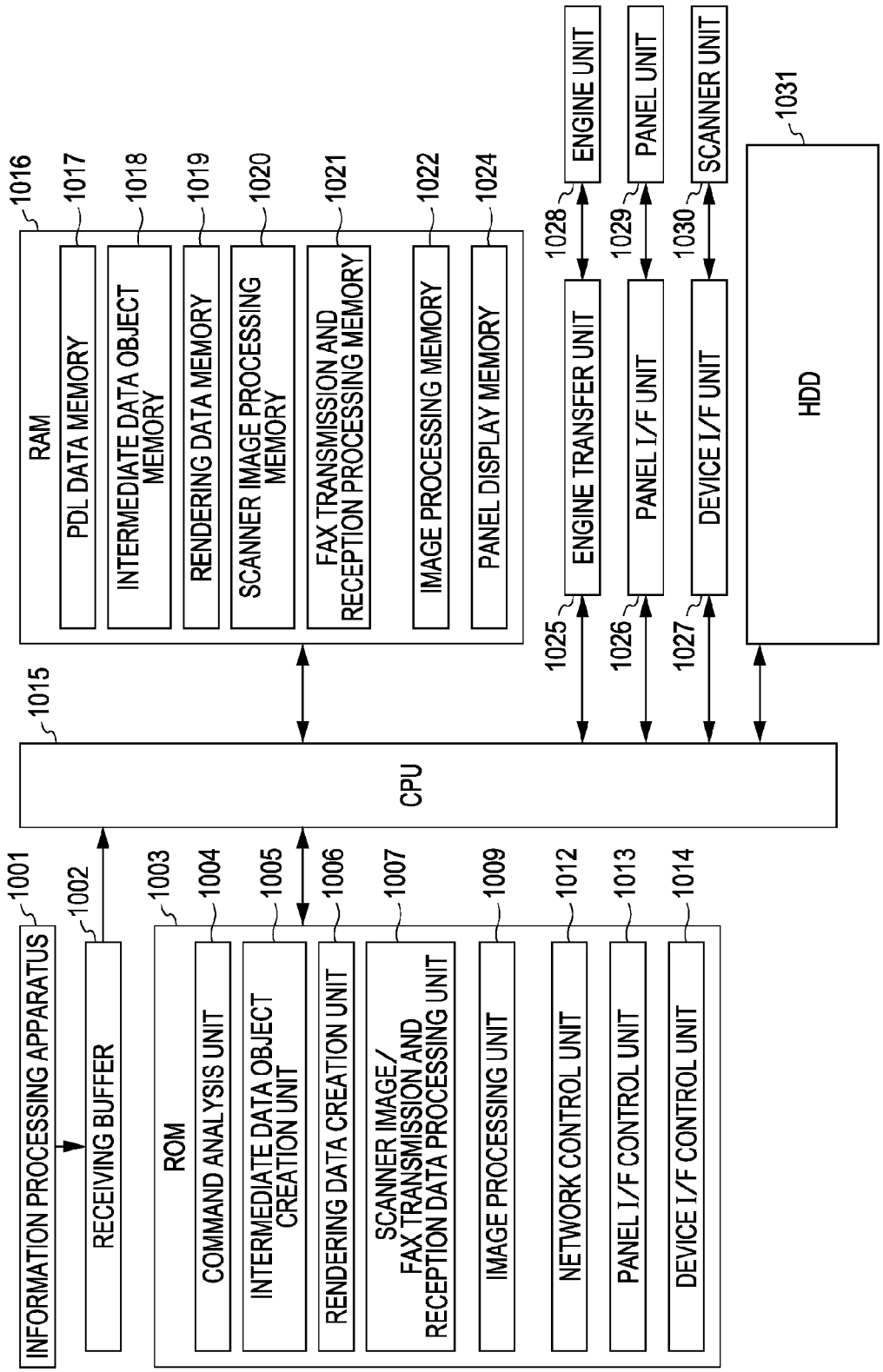
FIG. 2 is a block diagram illustrating the entire configuration of an image processing system according to an embodiment.

FIG. 2 illustrates an example of the entire configuration of an image processing system according to the first embodiment of the present invention. The image processing system illustrated in FIG. 2 includes a controller (1002 to 1027) for controlling the image processing system, an engine unit 1028 (to be described in detail below with reference to FIG. 10), a panel unit 1029, and a scanner unit 1030.

An information processing apparatus 1001 transmits a print job to the image processing system (1002 to 1027). The information processing apparatus 1001 is connected to the image processing system (1002 to 1027) by a cable via a network such as Ethernet (registered trademark).

Data transmitted from the information processing apparatus 1001 to the image processing system (1002 to 1027) is temporarily stored in a receiving buffer 1002.

A ROM 1003 stores a program for the image processing system, and includes a command analysis unit 1004 for analyzing a PDL command and an intermediate data object creation unit 1005 for performing rendering processing, creating an intermediate data object from PDL data stored in a PDL data memory 1017 included in a RAM 1016, and storing the intermediate data object in an intermediate data object memory 1018 included in the RAM 1016.

The ROM 1003 includes a rendering data creation unit 1006 for performing rendering processing, converting the intermediate data object stored in the intermediate data object memory 1018 included in the RAM 1016 into rendering data (bitmap data), and storing the rendering data (bitmap data) in a rendering data memory 1019 included in the RAM 1016.

The ROM 1003 includes a scanner image/FAX transmission and reception data processing unit 1007 for processing a scanner image and FAX transmission/reception data, and an image processing unit 1009 for performing color processing and screen processing upon image data to be transmitted to the engine unit 1028.

The ROM 1003 includes a network control unit 1012 for performing network control, a panel I/F control unit 1013 for performing panel interface control, and a device I/F control unit 1014 for controlling an interface for the scanner unit 1030.

A CPU 1015 is a CPU for the image processing system, and performs overall control of the image processing system.

The RAM 1016 is used in the image processing system, and includes a PDL data memory 1017 for storing the command analysis data analyzed by the command analysis unit 1004.

The RAM 1016 includes the intermediate data object memory 1018 for storing the intermediate data object created from the PDL data stored in the PDL data memory 1017 by the intermediate data object creation unit 1005.

The RAM 1016 includes the rendering data memory 1019 for storing the rendering data created from the intermediated data object stored in the intermediate data object memory 1018 by the rendering data creation unit 1006.

The RAM 1016 includes a scanner image processing memory 1020 used for scanner image processing and a FAX transmission and reception processing memory 1021 used for FAX transmission/reception processing, an image processing memory 1022 used for image processing, and a panel display memory 1024 used for panel display processing.

An engine transfer unit 1025 for transferring bitmap information to the engine unit 1028 (to be described in detail below with reference to FIG. 10), a panel I/F unit 1026 for transferring panel information to the panel unit 1029, a device I/F unit 1027 for communicating with the scanner unit 1030, the engine unit 1028, the panel unit 1029, the scanner unit 1030, and an HDD 1031 are illustrated.

Engine Unit in Image Processing System

Figure 10:
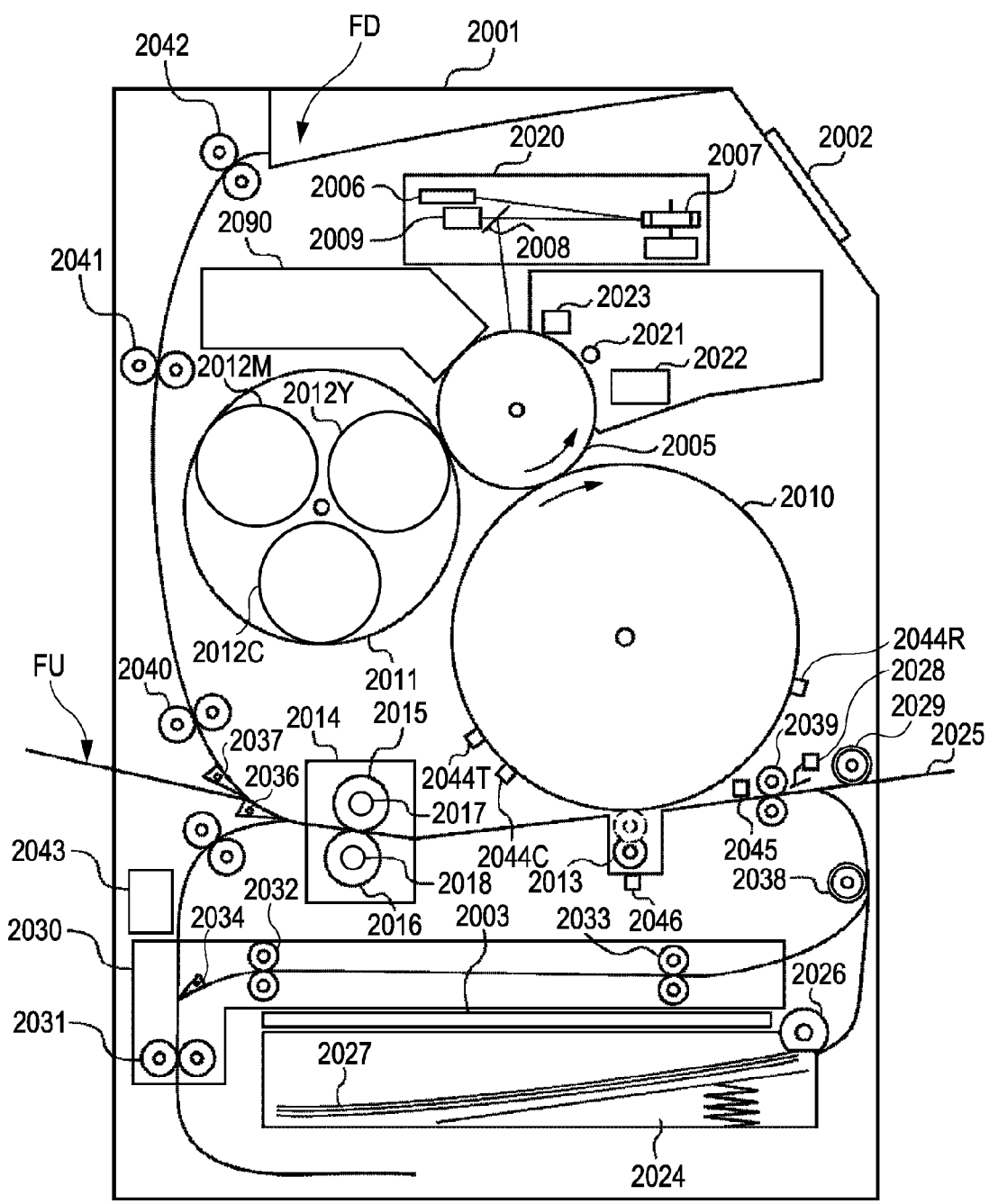
FIG. 10 is a cross-sectional view of an engine unit included in an image processing system according to the first embodiment.

FIG. 10 illustrates an exemplary configuration of the engine unit 1028 included in an image processing system.

As illustrated in FIG. 10, the engine unit 1028 is provided with a housing 2001. The housing 2001 contains the following mechanisms. These mechanisms are controlled by the CPU 1015.

First, electrostatic latent images are formed on a photosensitive drum by laser beam scanning. The electrostatic latent images are visualized, and the visualized images are multiple-transferred onto an intermediate transfer member 2010. There is provided an optical processing mechanism for transferring a color image obtained by the multiple transfer to a transfer medium 2027 as a toner image.

There are provided a fixing processing mechanism for fixing the toner image transferred to the transfer medium 2027, a transfer medium feeding processing mechanism, and a transfer medium conveyance processing mechanism.

The optical processing mechanism includes a laser driver 2006 for performing in a laser scanner portion 2020 ON or OFF control of laser light emitted from a semiconductor laser (not illustrated) in accordance with image data supplied from the controller (1002 to 1027). The laser light emitted from the semiconductor laser is directed to a scanning direction by a rotatable polygon mirror 2007.

The laser light directed to the main scanning direction is transferred to a photosensitive drum 2005 via a reflecting mirror 2008, and is emitted on the photosensitive drum 2005 in the main scanning direction.

The photosensitive drum 2005 is charged by a primary charging device 2023, and is subjected to scanning exposure with laser light, so that a latent image is formed thereon. The latent image is visualized with toner as a toner image.

The toner image is created in such a manner that toner is transferred (primary transfer) to the intermediate transfer member 2010 from the photosensitive drum 2005 to which a voltage opposite in polarity to the toner image is applied.

In forming a color image, development is performed by a yellow developing device 2012Y, a magenta developing device 2012M, a cyan developing device 2012C, and a black developing device 2090 in this order while a developing rotary 2011 rotates every rotation of the intermediate transfer member 2010.

During four rotations of the intermediate transfer member 2010, yellow, magenta, cyan and black visible images are sequentially formed, so that a full-color visible image is formed.

In forming a monochrome image, development is performed only by the black developing device 2090. A black visible image is formed during one rotation of the intermediate transfer member 2010, and the monochrome visible image is formed on the intermediate transfer member 2010 (primary transfer).

The toner image formed on the intermediate transfer member 2010 is transferred onto the transfer medium 2027. The transfer medium 2027 waiting at a registration shutter 2028 is conveyed and pressed against the intermediate transfer member 2010 by a transfer roller 2013. At the same time, a bias opposite in polarity to toner is applied to the transfer roller 2013. As a result, the toner image formed on the intermediate transfer member 2010 is transferred (secondary transfer) onto the transfer medium 2027 in synchronization with feeding of the transfer medium 2027 in a sub-scanning direction which is performed by the transfer medium feeding processing mechanism.

The photosensitive drum 2005, the yellow developing device 2012Y, the magenta developing device 2012M, the cyan developing device 2012C, and the black developing device 2090 are detachable. The developing devices except for the black developing device may be contained in the developing rotary 2011.

The reflecting mirror 2008 is a semi-transmitting mirror, and a beam detector 2009 for detecting laser light is disposed behind the reflecting mirror 2008. A laser light detection signal is supplied to a printer controller 2003.

The controller (1002 to 1027) generates a horizontal synchronization signal for determining exposure timing in a main scanning direction on the basis of the laser light detection signal supplied from the beam detector 2009. The horizontal synchronization signal is output to the controller (1002 to 1027).

A cleaner 2022 removes toner remaining on the photosensitive drum 2005. A pre-exposure lamp 2021 optically discharges the photosensitive drum 2005.

The transfer roller 2013 is movable in the horizontal direction in the drawing, and has a driving portion. While toner images of four colors are formed on the intermediate transfer member 2010, that is, the intermediate transfer member 2010 rotates a plurality of times, the transfer roller 2013 stays down and is apart from the intermediate transfer member 2010 as indicated by the solid line in the drawing so as not to interrupt the formation of the toner images.

After the toner images of four colors have been formed on the intermediate transfer member 2010, a cam member (not illustrated) presses the transfer roller 2013 against an upper position indicated by the dotted line in the drawing in synchronization with the transfer of a color image on the transfer medium 2027.

That is, the transfer roller 2013 is pressed against the intermediate transfer member 2010 via the transfer medium 2027 at a predetermined pressure. At that time, the transfer roller 2013 receives a bias to transfer the toner images on the intermediate transfer member 2010 onto the transfer medium 2027.

A transfer roller cleaner 2046 cleans the transfer roller 2013, if toner is applied from the intermediate transfer member 2010 to an area outside the transfer medium, and is then transferred to the transfer roller 2013. Various sensors are disposed around the intermediate transfer member 2010.

There are provided an image formation start position detection sensor 2044T for determining the print start position in forming an image, a sheet feeding timing sensor 2044R for adjusting feeding timing of a transfer medium, and a density sensor 2044C for measuring the density of a patch image in density control.

When density control is performed, the density sensor 2044C measures the density of each patch.

The fixing processing mechanism includes a fixing device 2014 for fixing a toner image transferred on the transfer medium 2027 by heat pressing.

The fixing device 2014 includes a fixing roller 2015 for applying heat to the transfer medium 2027, and a pressing roller 2016 for pressing the transfer medium 2027 against the fixing roller 2015.

The fixing roller 2015 and the pressing roller 2016 are hollow rollers, and includes heaters 2017 and 2018, respectively. The fixing roller 2015 and the pressing roller 2016 transfer the transfer medium 2027 when they are driven to rotate.

A transfer medium determination sensor 2045 for automatically detecting the type of a transfer medium and improving the fixability is disposed. By adjusting a time period for which a transfer medium is passed through the fixing device in accordance with the characteristic of the transfer medium, a time period for which the transfer medium is conveyed is changed.

The transfer medium feeding processing mechanism includes a cassette 2024 for holding the transfer medium 2027 and a manual insertion tray 2025.

The transfer medium feeding processing mechanism is configured to selectively feed a transfer medium from the cassette 2024 or the manual insertion tray 2025.

The cassette 2024 includes a size detection mechanism for electrically detecting the size of a transfer medium by detecting the position of a partition plate (not illustrated).

Transfer media are conveyed to a sheet feeding roller 2038 one by one from a transfer medium at the top of the stack of transfer media held in the cassette 2024 by rotating a cassette sheet feeding clutch 2026.

The cassette sheet feeding clutch 2026 includes a cam that is intermittently rotated by a driving portion (not illustrated) each time a sheet is fed. That is, a single transfer medium is fed each time the cam rotates.

The sheet feeding roller 2038 conveys the transfer medium until the leading end of the transfer medium moves to a position corresponding to the registration shutter 2028.

The registration shutter 2028 stops or restarts the feeding of a transfer medium by applying or releasing pressure to the transfer medium. The operation of the registration shutter 2028 is controlled in synchronization with the sub-scanning of laser light.

The manual insertion tray 2025 is disposed at the housing 2001. If a user puts a transfer medium on the manual insertion tray 2025, the transfer medium is fed to the registration shutter 2028 by a sheet feeding roller 2009.

The transfer medium conveyance processing mechanism for conveying a transfer medium includes a conveyance roller 2039, flappers 2036 and 2037, conveyance rollers 2040, 2041, and 2042, and a driving portion for driving these conveyance rollers.

The conveyance roller 2039 conveys a transfer medium to the intermediate transfer member 2010 when the pressure applied by the registration shutter 2028 to the transfer medium is released.

The flappers 2036 and 2037 transfer a transfer medium from the fixing device 2014 to a sheet output tray FD disposed on the top of the housing 2001.

The conveyance rollers 2040, 2041, and 2042 convey a transfer medium. The driving portion (not illustrated) drives the conveyance rollers 2040, 2041, and 2042.

The flapper 2037 can change a sheet output tray, that is, switch between the sheet output tray FD formed on the top of the housing 2001 and a sheet output tray FU formed on the side of the housing 2001.

Duplex printing can be performed by exchanging the flapper 2036.

A reverse sheet feeding portion 2030 has engine conveyance rollers 2031, 2032, and 2033 and a flapper 2034.

The housing 2001 is provided with a panel portion 2002 (the panel unit 1029 illustrated in FIG. 2). An external memory unit 2043 is an external memory used for storage of print data.

General Image Processing

Next, a printing operation performed in the above-described image processing system will be described.

After the information processing apparatus 1001 has performed printing in accordance with a user's instruction, control code and data transmitted from the information processing apparatus 1001 via a network cable are temporarily stored in the receiving buffer 1002.

The data is transmitted from the receiving buffer 1002 to the command analysis unit 1004, and is then analyzed in accordance with a program described in the command analysis unit 1004. The analyzed data is stored in the PDL data memory 1017.

The data is processed in accordance with a program described in the intermediate data object creation unit 1005, so that an intermediate data object is generated for each (image object) of graphic data, character data, and image data.

If the intermediate data objects are generated for all image objects included in one page, these intermediate data objects are converted into pieces of rendering data in accordance with a program described in the rendering data creation unit 1006. The converted pieces of bitmap data are subjected to color conversion and screen processing in the image processing unit 1009.

The pieces of bitmap data, which have been subjected to the screen processing, are transmitted to the engine unit 1028 via the engine transfer unit 1025, and are then printed on a transfer medium. The printed transfer medium is output from a specified sheet output port.

Next, an image processing process according to the first embodiment will be described with reference to FIG. 1. This process is performed by the CPU 1015 illustrated in FIG. 2.

Image data transmitted from an information processing apparatus via a printer driver is input into a controller (1002 to 1027) as PDL data (step S101).

The controller (1002 to 1027) determines whether a region to be converted is detected from the input PDL data (step S102). The region to be converted will be described in detail below.

If the region to be converted is not detected from the PDL data (NO in steps S102), the image processing unit 1009 performs image processing B (step S104).

In the image processing B, image data is converted into pieces of color data of cyan, magenta, yellow, and black, and these pieces of color data are quantized and are then subjected to screen processing. For example, a portion painted red is converted into pieces of color data of magenta and yellow, and these pieces of color data are subjected to screen processing (see e.g., FIG. 4). In FIG. 4, a left part illustrates an original image, and a right part illustrates an image that has been subjected to the screen processing.

If the region to be converted is detected from the image data (YES in step S102), image processing A is performed (step S103). The image processing A is image processing employing the "watercolor effect".

The image processing unit 1009 acquires color information of an inner portion inside the region to be converted in which image formation is to be performed, and renders a border of the inner portion inside the region to be converted using a color having a density higher than that of a color indicated by the color information (see e.g., FIG. 5).

In FIG. 5, a left part illustrates a detected image, and a right part illustrates an image that has been subjected to the image processing A. The image processing A will be described in detail below.

The image that has been subjected to image processing is transmitted from the engine transfer unit 1025 to the engine unit, and is then recorded on a sheet (step S105).

The image that has been subjected to image processing can be transmitted and output without being printed.

Detection Method of Region to Be Converted

Figure 6:
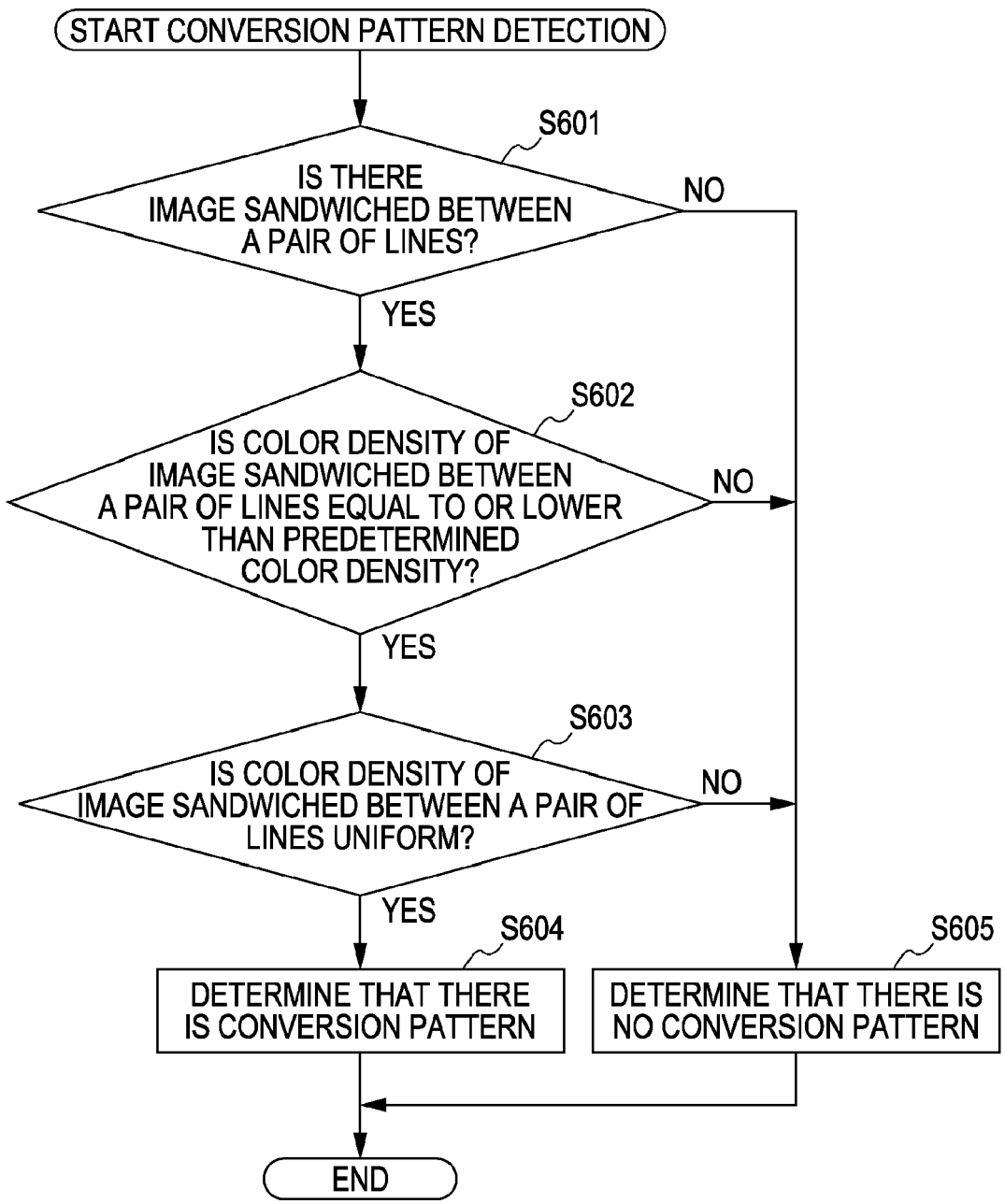
FIG. 6 is a flowchart describing an example of a process of detecting the region to be converted according to the first embodiment.

A detection method of the region to be converted will be described with reference to FIG. 6. The process illustrated in FIG. 6 is performed by the CPU 1015 illustrated in FIG. 2.

First, the image processing unit determines whether there is an image sandwiched between at least a pair of lines (S601).

The sandwiched image is not necessarily in enclosed space. For example, the sandwiched image may be in a space between a pair of lines as illustrated in FIG. 3C, or may not be a rectangle as illustrated in FIG. 3B.

It is determined whether the density of the sandwiched image is equal to or lower than a predetermined density (step S602). It is assumed that the predetermined density is a density of 15% that is the same as the density of the most highlighted portion.

Furthermore, it is determined whether the pixel density of the sandwiched image is uniform (step S603).

Only if Yes in steps S601, S602, and S603, it is determined that there is a region to be converted (step S604). If No in any one of steps S601, S602, and S603, it is determined that there is no region to be converted (step S605).

For example, the region to be converted may be an image illustrated in FIG. 3A, 3B, or 3C which is sandwiched between lines and in which an image of uniform density equal to or lower than a predetermined density is to be formed.

It may be difficult to reproduce a low-density area in an electrophotographic image processing apparatus using a method in the related art. However, by performing the image processing A to be described in detail below upon the region to be converted so as to generate a pseudo low-density area using a human visual characteristic, it is possible to stably reproduce such a low-density area.

The stable reproduction of a low-density area means that a recording material such as toner can be supplied in accordance with a specified density value regardless of an environmental change after installation of an apparatus, the temperature or humidity at an installation location of an apparatus, or the endurance of a used sheet or apparatus.

Image Processing A

Figure 7:
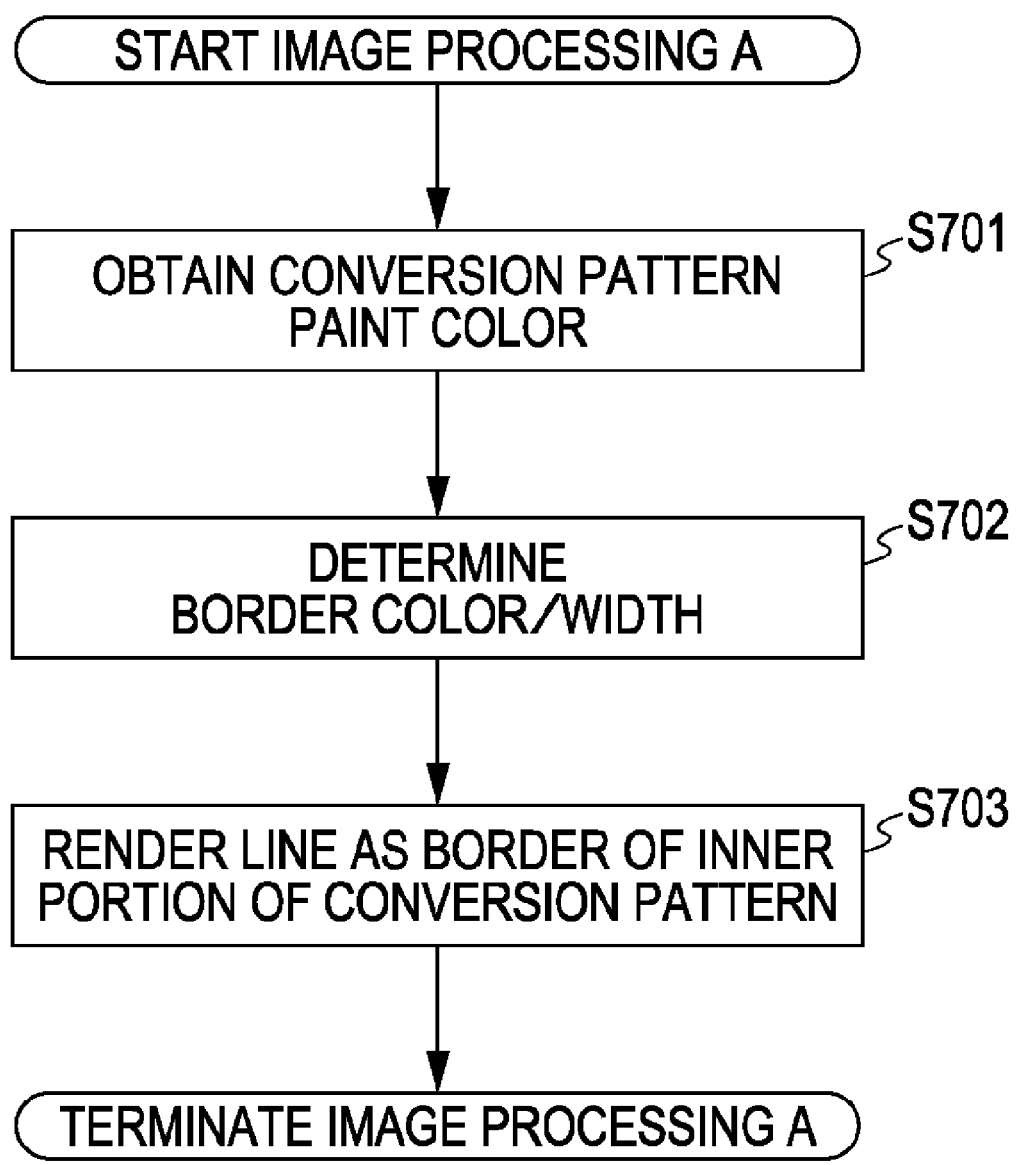
FIG. 7 is a flowchart describing an example of the image processing A according to the first embodiment.

The image processing A will be described with reference to FIG. 7. The process illustrated in FIG. 7 is performed by the CPU 1015.

In the image processing A, information about a paint color of the region to be converted is obtained from PDL data (step S701). On the basis of the obtained paint color information, an inner portion of the region to be converted is bordered by a line. As the color of the border line, a color having the same hue as that of an original color used for an image formed in the region to be converted and having a luminance level lower than that of the original color (a density higher than that of the original color) is selected. The color having the same hue as that of the original color represents a color illusively perceived as being equivalent to the original color or a color used to give a viewer the illusion that the color is similar to the original color when the most highlighted portion is reproduced using the "watercolor effect". The density of the border line is higher than that of the paint color (step S702). The density of the border line is calculated, for example, using the following equation.

$$DL = Dp * n + \alpha$$

In this equation, DL denotes the density of a line, Dp denotes the density of a paint color of the region to be converted, n denotes a correction coefficient, and $\alpha$ denotes a correction value.

The width of a line may be optionally determined. However, since a line of an excessively large width is noticeable, it is desirable that a line having a width of five points or less be used. The width of a rendered line does not significantly affect the effect of painting.

An inner portion inside the region to be converted is bordered by a line having the determined density and the determined width (step S703). At that time, the output setting (color information) of a recording material, which is set in the PDL data so as to form an image in the region to be converted, may be reset. That is, the PDL data may be converted so as to prevent recording of the most highlighted portion which has been originally set.

In order to obtain a greater effect of the image processing A, it is desirable that there be no gradation between the rendered line and the edge of the region to be converted. Even if the background of the region to be converted (the area outside the edge of the region do be converted) is colored, a similar effect can be obtained.

According to the first embodiment, the reproducibility of the most highlighted portion can be improved in outputting a printed image. Stable reproduction of the most highlighted portion of an original may therefore be provided. The first embodiment is available for a FAX transmission image.

Figure 8:
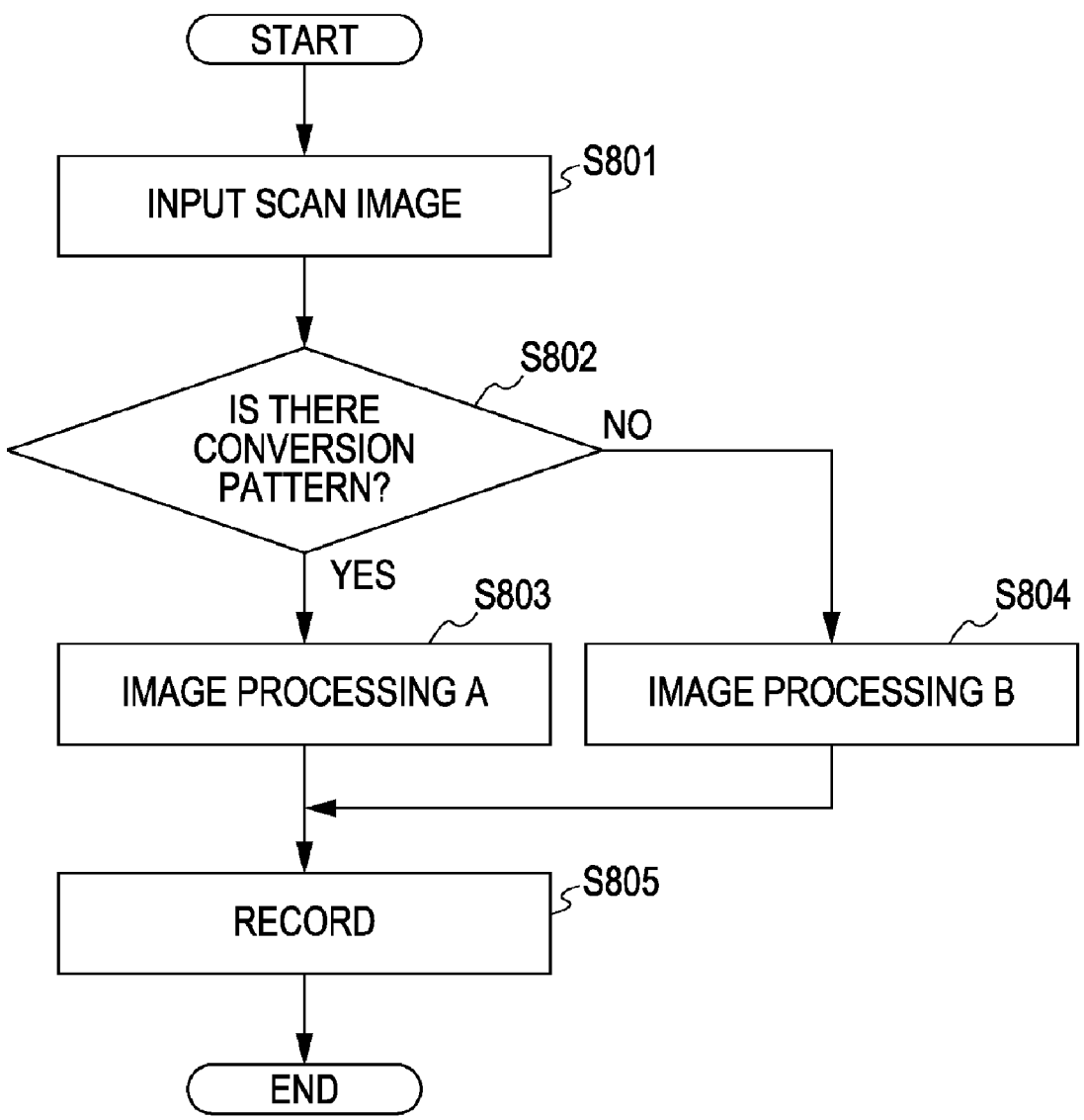
FIG. 8 is a flowchart describing an example of a second embodiment.

The second embodiment will be described with reference to FIG. 8. The process illustrated in FIG. 8 is performed by the CPU 1015 illustrated in FIG. 2. If a user makes a copy, image data is transmitted to the controller (1002 to 1027) via the scanner unit 1030, and is then output to the image processing unit 1009 as a scan image (step S801).

The image processing unit 1009 determines whether a region to be converted is detected from the scan image (step S802). If the region to be converted is not detected from the scan image (NO in step S802), the image processing B is performed (step S804).

In the image processing B, image data is converted into pieces of color data of cyan, magenta, yellow, and black, and these pieces of color data are quantized and are then subjected to screen processing. For example, a portion painted red is converted into pieces of color data of magenta and yellow, and these pieces of color data are subjected to screen processing (see e.g., FIG. 4). In FIG. 4, a left part illustrates an original image, and a right part illustrates an image that has been subjected to the screen processing.

If the region to be converted is detected from the image data (YES in step S802), the image processing A is performed (step S803). As described previously, the image processing A is image processing employing the "watercolor effect", and may be performed as illustrated in the example shown in FIG. 7.

In FIG. 5, a left part illustrates a detected image, and a right part illustrates an image that has been subjected to the image processing A. The image processing A has been described in detail with reference to FIG. 7.

The image that has been subjected to image processing is transmitted from the engine transfer unit 1025 to the engine unit, and is then recorded on a sheet (step S805).

According to the second embodiment, the reproducibility of the most highlighted portion can be improved in outputting a printed image.

An apparatus for automatically changing predetermined density of an image detected as the region to be converted using density change data of an electrophotographic engine will be described as the third embodiment on the basis of the apparatus described in the first or second embodiment.

An engine always monitors the change in the density of toner applied to a sheet using the density sensor 2044C.

Accordingly, it may be determined that the engine cannot output an image having a density indicated by an input signal due to the endurance of an apparatus or the installation environment of the apparatus.

For example, an original image having a pixel density of 18% on a sheet and an original image having a pixel density of 10% on the sheet, which are input into an apparatus as signals, may be printed as images obtained by applying a recording material such as toner at approximately the same pixel density.

At that time, the engine transmits a determination result to the image processing unit 1009 via the engine transfer unit 1025 as engine information.

On the basis of the engine information, the image processing unit 1009 increases the predetermined density used for detection of the region to be converted.

That is, if the predetermined density used for the detection of the region to be converted is increased, an image having a pixel density of 15% or more, which is not usually detected as the most highlighted portion, may be determined to include the region to be converted.

Accordingly, even if the density of an image is higher than the predetermined density that is the same as that of the most highlighted portion, the image includes a portion to be subjected to the image processing A using the "watercolor effect" as illustrated in the example shown in FIG. 7.

Thus, in the third embodiment, when the region to be converted is detected, a predetermined pixel density used for the detection of the most highlighted portion is changed on the basis of the engine information.

As a result, in outputting a copied/printed image, the most highlighted portion can be stably detected and reproduced without being affected by the density change of an engine.

An apparatus for allowing a user to optionally set a predetermined density used for the detection of the region to be converted will be described as the fourth embodiment on the basis of the apparatus described in the first or second embodiment.

It is assumed that a user can input a predetermined density value at any one of a driver, a body panel, and a remote panel such as a Web panel.

Figure 12:
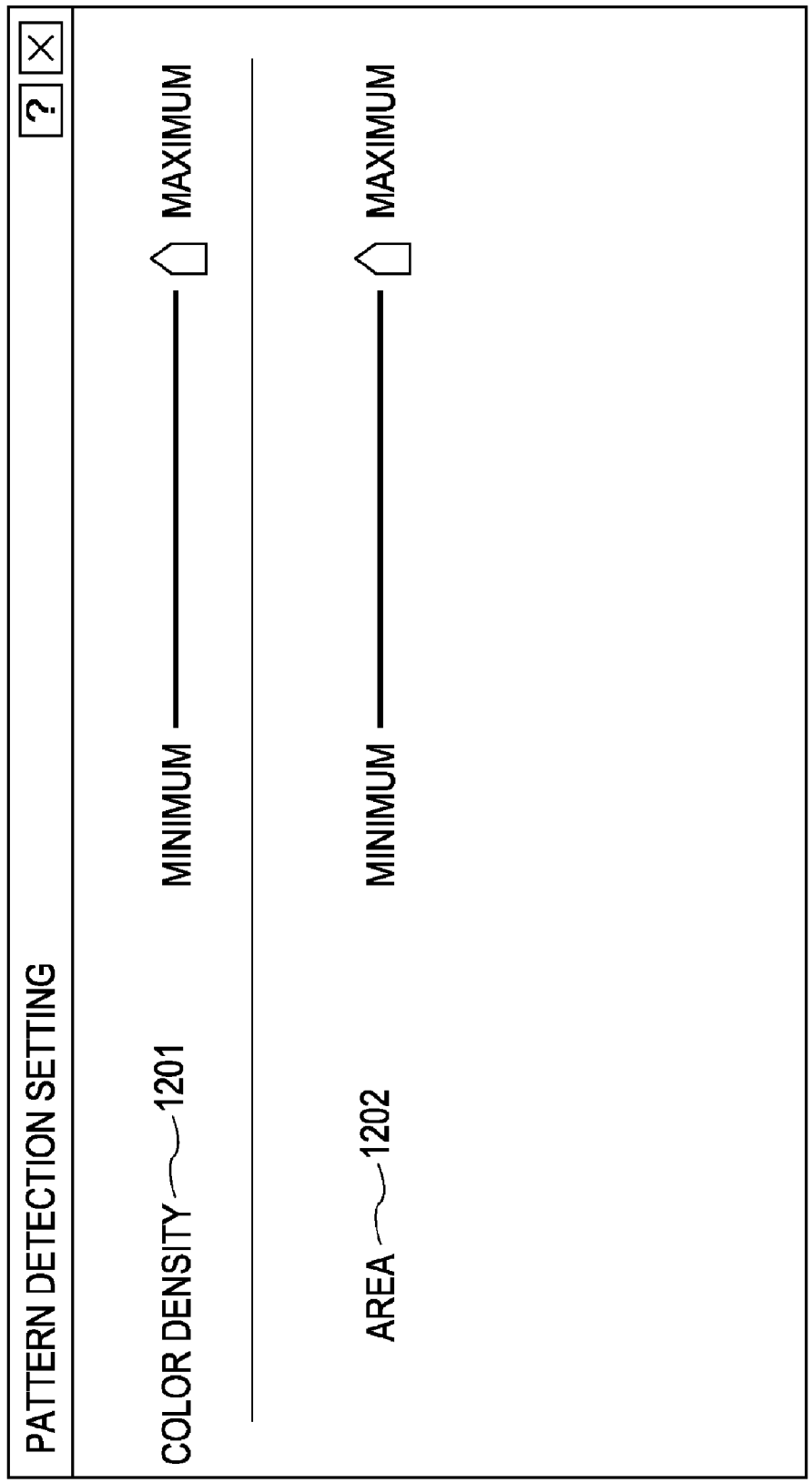
FIG. 12 illustrates a driver UI screen according to a sixth embodiment.

FIG. 12 illustrates an example of a setting screen of a driver UI used to detect the region to be converted.

Density 1201 allows a user to set a predetermined density used for detection of a certain region.

If a lever is moved to the minimum density, the density range of a region to be detected is narrowed. If the lever is moved to the maximum density, the density range of the region to be detected is extended and a high density can be detected.

That is, if the density range of the region to be detected is narrowed, the image processing A using the "watercolor effect" is performed upon only a region having a low pixel density.

On the other hand, if the density range of the region to be detected is extended, the image processing A using the "watercolor effect" can also be performed upon a region having a high pixel density.

According to the fourth embodiment, a user can optionally control the reproducibility of the most highlighted portion in outputting a copied/printed image, and image processing according to the present invention can be applied to a user's desired color region.

An apparatus capable of determining an image to be detected as the region to be converted using the area of the image will be described as the fifth embodiment on the basis of the apparatus described in the first or second embodiment. That is, only an image having a predetermined area is detected as the region to be converted, and a user can optionally set the predetermined area.

Figure 9:
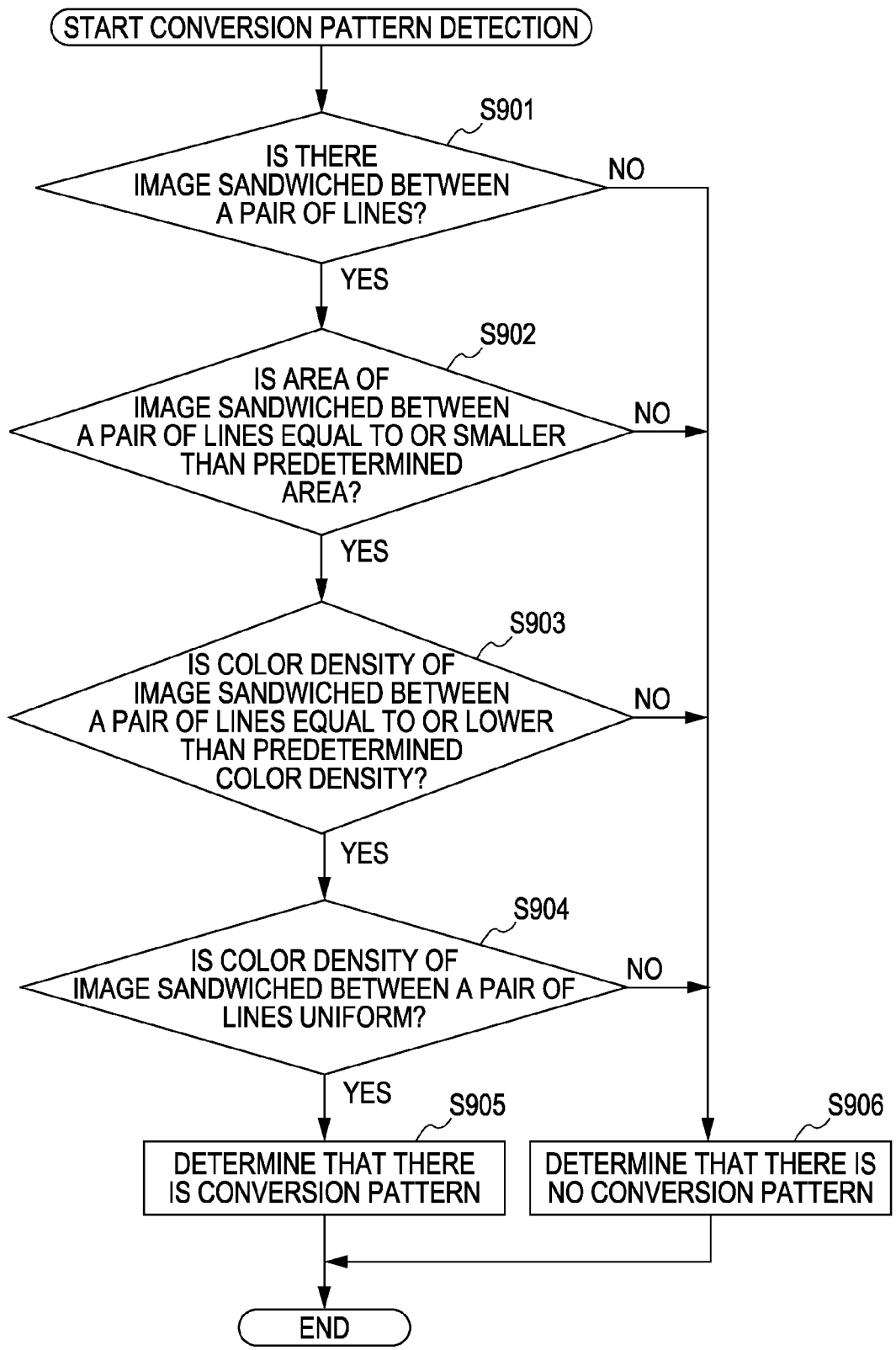
FIG. 9 is a flowchart describing an example of a fifth embodiment.

FIG. 9 illustrates an example of a process of detecting the region to be converted. The process may be performed by the CPU 1015 illustrated in FIG. 2.

The process illustrated in FIG. 9 is obtained by adding the determination of whether the area of a sandwiched image is equal to or smaller than a predetermined area (step S902) to the process illustrated in FIG. 6 described in the first embodiment. The predetermined area may be set in advance by an administrator of an apparatus.

It is known that the area of an image achieving the "watercolor effect" is proportional to the distance between each eye and a sheet. Accordingly, if an image is output on a frequently used A4 sheet, it is desirable that the image processing A be performed upon a region having an area of 25 cm$^2$ (5*5 cm) or less so as to obtain a grater effect of the image processing A.

Accordingly, in an apparatus in which an A4 sheet is frequently used as a print medium, a predetermined area of 25 cm$^2$ is set and the image processing A using the "watercolor effect" is performed upon a region having an area of 25 cm$^2$ or less.

According to the fifth embodiment, if the most highlighted portion is reproduced by performing image processing using the "watercolor effect" upon the most highlighted portion in outputting a copied/printed image, it is possible to perform the image processing using the "watercolor effect" upon only a region having an area achieving a greater effect of the image processing.

An apparatus for allowing a user to optionally set a predetermined area used to detect the region to be converted will be described as the sixth embodiment on the basis of the apparatus described in the fifth embodiment.

It is known that the area of an image achieving the "watercolor effect" is proportional to the distance between each eye and a sheet. Accordingly, if an image is output on a frequently used A4 sheet, it is desirable that the image processing A be performed upon a region having an area of 25 cm$^2$ (5*5 cm) or less so as to obtain a greater effect of the image processing A.

If an image is output on an A4 sheet as a poster image or the like, the distance between each eye and the A4 sheet is relatively long. Accordingly, even if the image processing A is performed upon a region having an area of 100 cm$^2$ (10*10 cm) or more, the effect of the image processing A can be obtained. A predetermined area of a region to be subjected to the image processing A is therefore determined by a user at the time of printing.

It is assumed that a user can input a predetermined area at any one of a driver, a body panel, and a remote panel such as a Web panel.

FIG. 12 illustrates an example of a setting screen of a driver UI used to detect the region to be converted. Area 1202 allows a user to optionally set a predetermined area used for detection of the region to be converted in consideration of the size of a print sheet each time printing is performed.

If a lever is moved to the minimum area, the area of the region to be converted is reduced. If the lever is moved to the maximum area, the area of the region to be converted is increased. For example, if printing of a poster is performed, the lever is moved to the maximum area since the effect of the image processing A using the "watercolor effect" can be obtained even in a large region.

Thus, if a user can optionally set a predetermined area of the region to be converted, it is possible to effectively perform the image processing A upon a pattern region having a relatively large area.

According to the sixth embodiment, a user can optionally control a predetermined area of a region where the most highlighted portion is to be reproduced at the time of outputting a copied/printed image, and image processing according to the present invention can be applied to only a rectangle having a desired area in consideration of the size of an output image.

An apparatus for detecting the region to be converted and allowing a user to determine whether the image processing A should be performed upon the detected region to be converted will be described as the seventh embodiment.

In the image processing A, the original setting of a recording material used for image formation on an inner portion of an image corresponding to PDL data is canceled so as to generate the border of the inner portion. Accordingly, the image processing A is performed with consent of a user. That is, a processing determination unit is disposed for receiving a processing determination signal input by a user from any one of a driver, a body panel, and a remote panel such as a Web panel.

Figure 11:
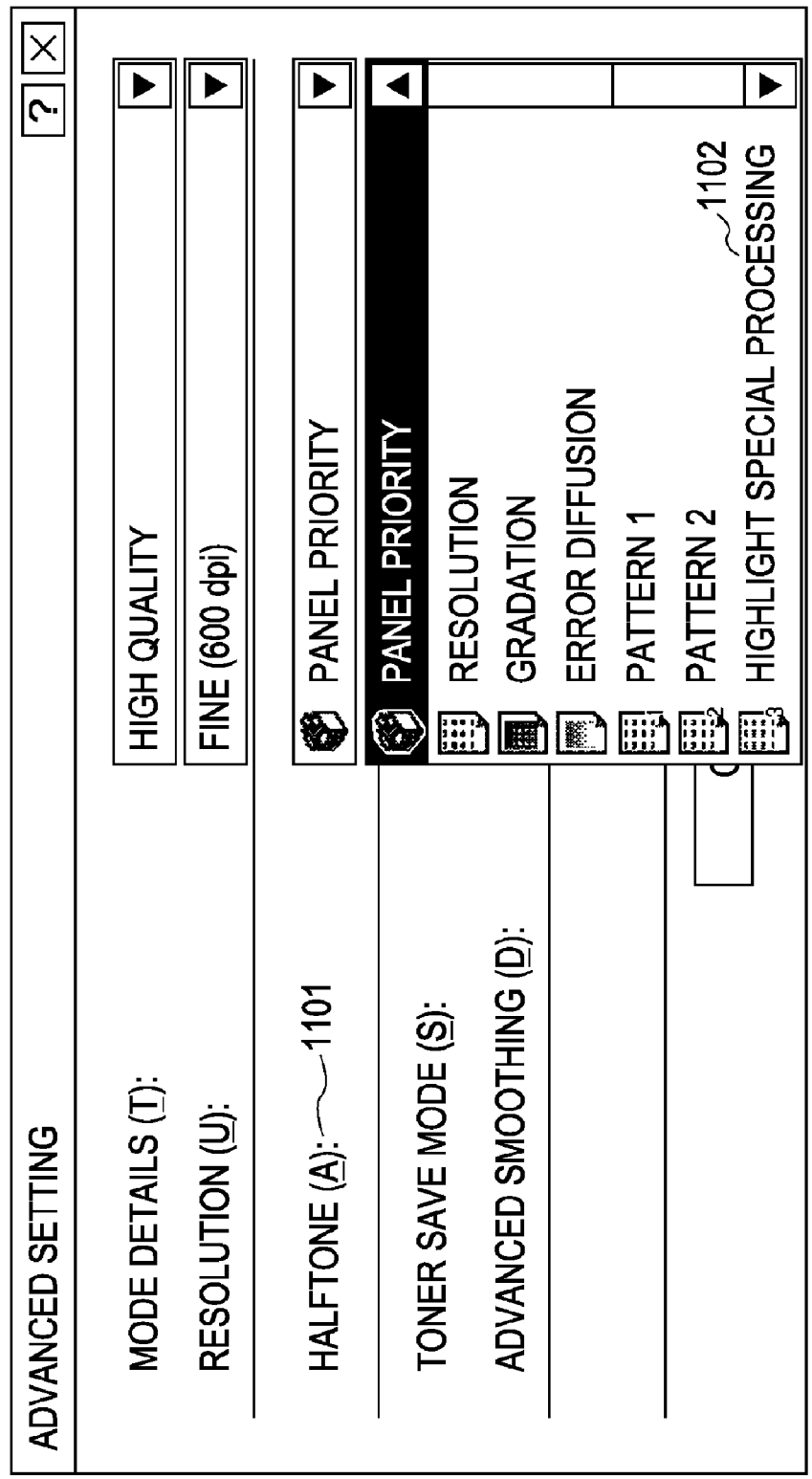
FIG. 11 illustrates a driver UI screen according to fourth and seventh embodiments.

FIG. 11 illustrates an example of an image processing setting screen of a driver UI. Halftone 1101 allows a user to select one of screen settings. If the image processing A is desired, highlight special processing 1102 is selected.

According to the seventh embodiment, a user can determine whether the image processing A according to the present invention should be used.

An apparatus capable of previewing an image that has been subjected to the image processing A will be described as the eighth embodiment on the basis of the apparatuses described in the first to seventh embodiments. Previewing is performed by the panel I/F unit 1026 and the panel unit 1029 which are illustrated in FIG. 2. A preview screen may be remotely displayed on an information processing apparatus via the Web.

Figure 13:
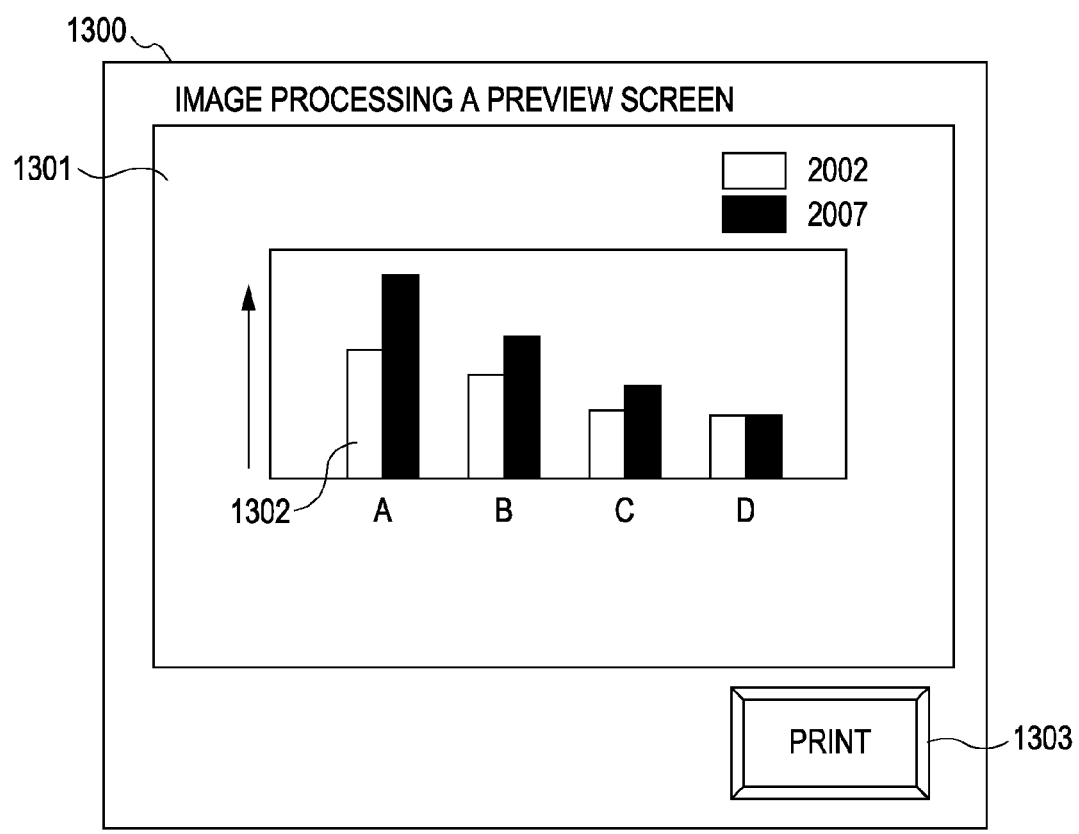
FIG. 13 illustrates a preview screen according to an eighth embodiment.

FIG. 13 is a diagram illustrating an example of a preview screen. A displayed image 1302 that has been subjected to the image processing A is bordered by a line. An image 1301 that has been subjected to the image processing B is displayed.

If a user presses a print button 1303 after checking the preview screen, printing is started.

According to the eighth embodiment, a user can check a result of image processing according to the present invention using a preview screen.

An apparatus for allowing a user to determine whether the image processing A should be performed while checking a preview screen, which is like an apparatus according to the eighth embodiment, will be described as the ninth embodiment. A user can determine whether an image that has been subjected to the image processing A should be employed by checking the image on a preview screen.

Figure 14:
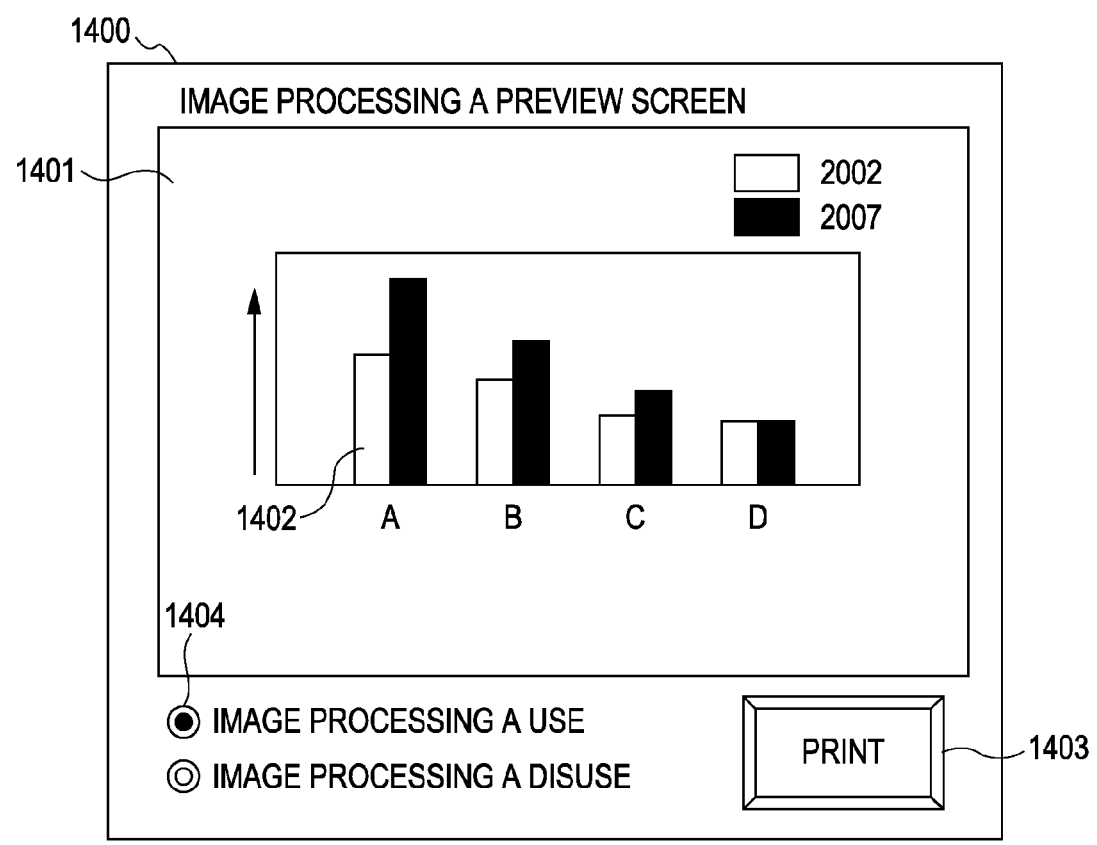
FIG. 14 illustrates a preview screen according to a ninth embodiment.

FIG. 14 illustrates an example of a preview screen. A displayed image 1402 that has been subjected to the image processing A is bordered by a line. An image 1401 that has been subjected to the image processing B is displayed.

If a user determines that the image processing A should be performed after checking the image displayed on the preview screen, the user presses an image processing A use button 1403. Subsequently, printing of the image that has been subjected to the image processing A is started.

According to the ninth embodiment, a user can determine whether a result of image processing according to the present invention should be employed by checking the result of the image processing on a preview screen.

A processing method of storing a program and/or computer-executable instructions that achieves functions of the above-described embodiments in a computer-readable storage medium, reading the program and/or computer-executable instructions from the storage medium as code, and executing the read code in a computer falls within a scope of the above-described embodiments. Not only the storage medium storing the above-described program but also the program and/or computer-executable instructions itself are included as aspects of the above-described embodiments.

Such storage media include a floppy disk, a hard disk, an optical disc, a magneto-optical disk, a CD-ROM, a magnetic tape, a nonvolatile memory card, and a ROM.

Not only the method of causing a single program and/or computer executable instructions stored in the above-described storage medium to perform processing but also a method of causing the program and/or computer-executable instructions to operate on an OS in conjunction with another piece of software or a function of an extension board so as to perform operations of the above-described embodiments fall within the scope of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2008-104647 filed Apr. 14, 2008, which is hereby incorporated by reference herein in its entirety.

What is claimed is:

1. An image processing apparatus comprising:
   a region detection unit configured to detect from an image a region which is sandwiched between a pair of opposite lines and in which image formation is performed at a density lower than a predetermined density;
   a rendering unit configured to render a border of an inner portion inside the region sandwiched between the pair of opposite lines with a line having a density higher than the predetermined density; and
   an outputting unit configured to output an image in which the inner portion inside the region sandwiched between the pair of opposite lines is bordered by the border rendered by the rendering unit.

2. The image processing apparatus according to claim 1, wherein the predetermined density is a density of 15%.

3. The image processing apparatus according to claim 1, wherein the border of the inner portion is rendered with the line having the same hue as that of a recording material used for image formation in the detected region and having a density higher than a density at which image formation is performed in the detected region.

4. The image processing apparatus according to claim 1, further comprising a density sensor configured to detect a density change of a recording material used for image formation on a sheet, and
   wherein the predetermined density is changed in accordance with the density change of a recording material detected by the density sensor.

5. The image processing apparatus according to claim 1, wherein predetermined density setting information is generated and is then displayed so as to allow a user to set the predetermined density using the predetermined density setting information.

6. The image processing apparatus according to claim 1, wherein a predetermined area used to evaluate the area of the region sandwiched between the pair of opposite lines is determined, and
   wherein, only in a case where the region sandwiched between the pair of opposite lines has an area smaller than the predetermined area, image processing is performed upon the region sandwiched between the pair of opposite lines.

7. The image processing apparatus according to claim 6, wherein the predetermined area used to evaluate the area of the region sandwiched between the pair of opposite lines is an area of 25 $cm^2$.

8. The image processing apparatus according to claim 6, wherein predetermined area setting information is generated and is then displayed so as to allow a user to set the predetermined area used to evaluate the area of the region sandwiched between the pair of opposite lines using the predetermined area setting information.

9. The image processing apparatus according to claim 6, wherein the predetermined area used to evaluate the area of the region sandwiched between the pair of opposite lines is determined in accordance with the area of a print sheet.

10. The image processing apparatus according to claim 1, wherein an image that has been subjected to rendering by the rendering unit can be checked on a preview screen.

11. The image processing apparatus according to claim 10, further comprising a receiving unit configured to, after the image that has been subjected to rendering by the rendering unit has been displayed on the preview screen, receive a result of determination of whether the image should be printed.

12. An image processing method comprising:
    using a processor to perform the following:
       detecting from an image a region which is sandwiched between a pair of opposite lines and in which image formation is performed at a density lower than a predetermined density;
       rendering a border of an inner portion inside the region sandwiched between the pair of opposite lines with a line having a density higher than the predetermined density; and
       outputting an image in which the inner portion inside the region sandwiched between the pair of opposite lines is bordered.

13. The image processing method according to claim 12, wherein the predetermined density is a density of 15%.

14. The image processing method according to claim 12, wherein the border of the inner portion is rendered with the line having the same hue as that of a recording material used for image formation in the detected region and having a density higher than a density at which image formation is performed in the detected region.

15. The image processing method according to claim 12, further comprising detecting a density change of a recording material used for image formation on a sheet, and
    wherein the predetermined density is changed in accordance with the detected density change of a recording material.

16. The image processing method according to claim 12, wherein predetermined density setting information is generated and is then displayed so as to allow a user to set the predetermined density using the predetermined density setting information.

17. The image processing method according to claim 12,
    wherein a predetermined area used to evaluate the area of the region sandwiched between the pair of opposite lines is determined, and
    wherein, only in a case where the region sandwiched between the pair of opposite lines has an area smaller than the predetermined area, image processing is performed upon the region sandwiched between the pair of opposite lines.

18. The image processing method according to claim 17, wherein the predetermined area used to evaluate the area of the region sandwiched between the pair of opposite lines is an area of 25 $cm^2$.

19. The image processing method according to claim 17, wherein predetermined area setting information is generated and is then displayed so as to allow a user to set the predetermined area used to evaluate the area of the region sandwiched between the pair of opposite lines using the predetermined area setting information.

20. The image processing method according to claim 17, wherein the predetermined area used to evaluate the area of the region sandwiched between the pair of opposite lines is determined in accordance with the area of a print sheet.

21. The image processing method according to claim 12, wherein an image that has been subjected to rendering can be checked on a preview screen.

22. The image processing method according to claim 21, further comprising receiving, after the image that has been subjected to rendering has been displayed on the preview screen, a result of determination of whether the image should be printed.

23. A computer-readable storage medium having computer-executable instructions stored therein for causing an image processing apparatus to execute an image processing method, the computer-readable storage medium comprising:
   computer-executable instructions for detecting from an image a region which is sandwiched between a pair of opposite lines and in which image formation is performed at a density lower than a predetermined density;
   computer-executable instructions for rendering a border of an inner portion inside the region sandwiched between the pair of opposite lines with a line having a density higher than the predetermined density; and
   computer-executable instructions for outputting an image in which the inner portion inside the region sandwiched between the pair of opposite lines is bordered.

* * * * *